US012739199B2

(12) United States Patent
Nandy et al.

(10) Patent No.: US 12,739,199 B2
(45) Date of Patent: Sep. 15, 2026

(54) EFFICIENT RESOURCE MANAGEMENT FOR ROLE-BASED TRAFFIC SEGMENTATION IN AN OVERLAY NETWORK

(71) Applicant: HEWLETT PACKARD ENTERPRISE DEVELOPMENT LP, Spring, TX (US)

(72) Inventors: Tathagata Nandy, Bangalore (IN); Venkatavaradhan Devarajan, Bangalore (IN); Yamini Krishna Sekuri, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 98 days.

(21) Appl. No.: 18/820,836

(22) Filed: Aug. 30, 2024

(65) Prior Publication Data

US 2026/0012416 A1 Jan. 8, 2026

(30) Foreign Application Priority Data

Jul. 2, 2024 (IN) ............................ 202441050551

(51) Int. Cl.
*H04L 45/64* (2022.01)
*H04L 45/655* (2022.01)

(52) U.S. Cl.
CPC ............ *H04L 45/64* (2013.01); *H04L 45/655* (2022.05)

(58) Field of Classification Search
CPC .............................. H04L 45/64; H04L 45/655
USPC .......................................................... 709/238
See application file for complete search history.

(56) References Cited

U.S. PATENT DOCUMENTS

2001/0055317 A1* 12/2001 Kajizaki ................. H04L 47/43 370/422
2020/0287737 A1* 9/2020 Mishra ................ H04L 12/4675
2023/0069306 A1* 3/2023 Majila ..................... H04L 45/16
2023/0113466 A1* 4/2023 Majila ..................... H04L 47/20 370/400

OTHER PUBLICATIONS

Mahalingam et al., "Virtual eXtensible Local Area Network (VXLAN): A Framework for Overlaying Virtualized Layer 2 Networks over Layer 3 Networks", Request for Comments: 7348, Aug. 2014, 22 pages.
Smith et al., "VXLAN Group Policy Option draft-smith-vxlan-group-policy-05", Oct. 22, 2018, 6 pages.

* cited by examiner

*Primary Examiner* — Zi Ye
(74) *Attorney, Agent, or Firm* — Hewlett Packard Enterprise Patent Department

(57) ABSTRACT

A first network device in a network is provided. During operation, the first network device can send a first packet of a first data flow to a second network device in the network. Here, a source of the first data flow can be associated with a first role and a destination of the first data flow can be associated with a second role. The first network device can receive, from the second network device, a control packet indicating that the second role is precluded from receiving traffic from the first role. The first network device can then identify the first data flow based on information in a payload of the control packet and remove an entry from a flow data structure maintained in the forwarding hardware of the first network device. The entry can include identifying information of the first data flow.

20 Claims, 8 Drawing Sheets

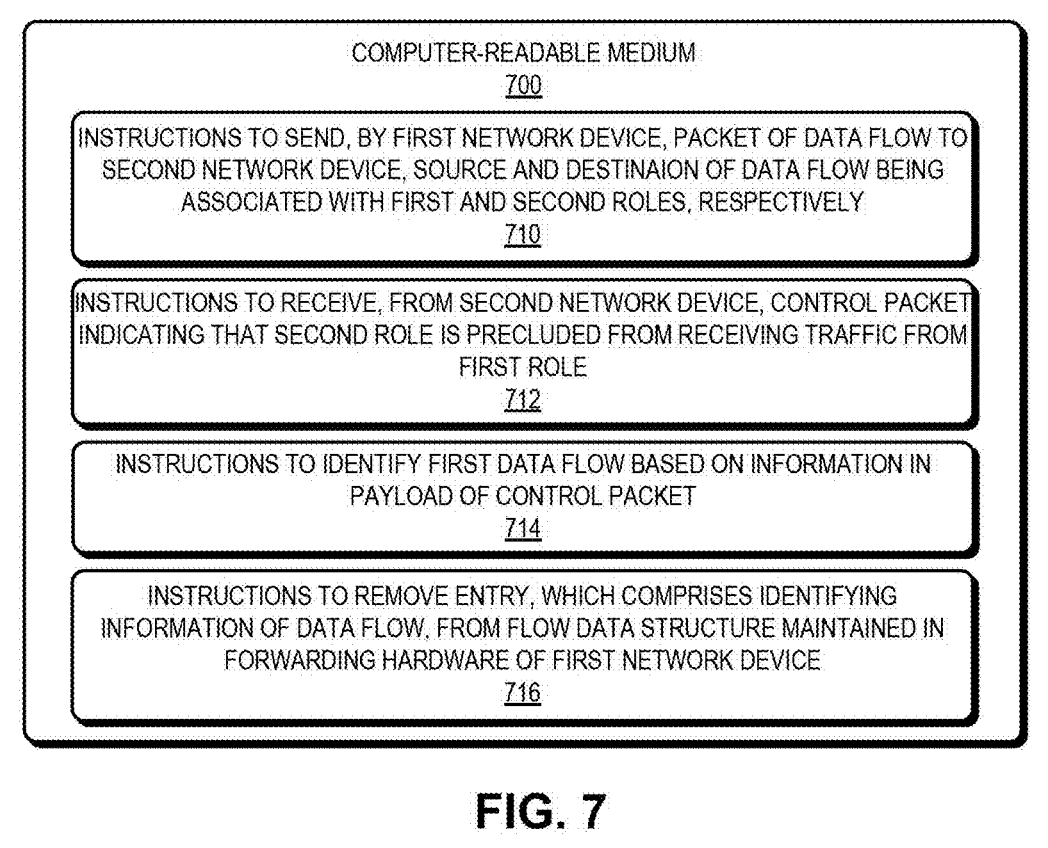

COMPUTER-READABLE MEDIUM
700

INSTRUCTIONS TO SEND, BY FIRST NETWORK DEVICE, PACKET OF DATA FLOW TO SECOND NETWORK DEVICE, SOURCE AND DESTINAION OF DATA FLOW BEING ASSOCIATED WITH FIRST AND SECOND ROLES, RESPECTIVELY
710

INSTRUCTIONS TO RECEIVE, FROM SECOND NETWORK DEVICE, CONTROL PACKET INDICATING THAT SECOND ROLE IS PRECLUDED FROM RECEIVING TRAFFIC FROM FIRST ROLE
712

INSTRUCTIONS TO IDENTIFY FIRST DATA FLOW BASED ON INFORMATION IN PAYLOAD OF CONTROL PACKET
714

INSTRUCTIONS TO REMOVE ENTRY, WHICH COMPRISES IDENTIFYING INFORMATION OF DATA FLOW, FROM FLOW DATA STRUCTURE MAINTAINED IN FORWARDING HARDWARE OF FIRST NETWORK DEVICE
716

FIG. 7

EFFICIENT RESOURCE MANAGEMENT FOR ROLE-BASED TRAFFIC SEGMENTATION IN AN OVERLAY NETWORK

BACKGROUND

A network device, such as a switch, may support different protocols and services. For example, the network device can support an overlay network formed based on tunneling and virtual private networks (VPNs). The network device can then facilitate overlay routing for a VPN over the tunnels.

BRIEF DESCRIPTION OF THE FIGURES

FIG. 7 illustrates an example of a computer-readable medium (CRM) facilitating efficient resource management for role-based traffic segmentation in an overlay network, in accordance with an aspect of the present application.

In the figures, like reference numerals refer to the same figure elements.

DETAILED DESCRIPTION

Figure 1:
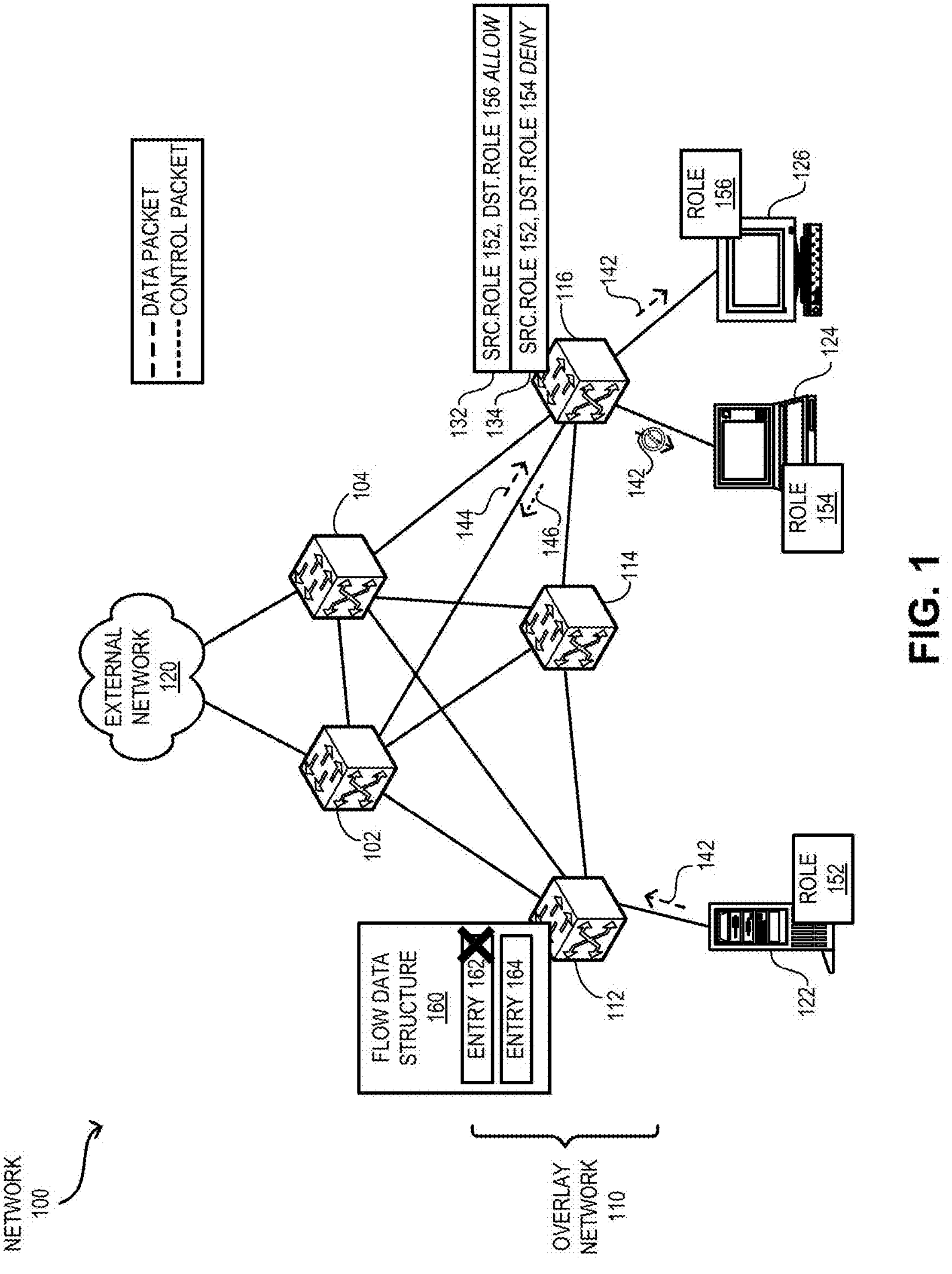
FIG. 1 illustrates an example of an overlay network supporting efficient resource management for role-based traffic segmentation in an overlay network, in accordance with an aspect of the present application.

The volume of traffic generated by various applications on end devices (or user devices) continues to increase. To efficiently forward and manage the traffic in a network, the network devices can be equipped with versatile capabilities, such as role-based traffic segmentation (RBTS). Since the devices with the same roles form a group of devices, RBTS can also be referred to as group-based traffic segmentation (GBTS). These network devices can be in an overlay network formed based on overlay routing for a VPN over a set of tunnels. For example, an Ethernet VPN (EVPN) can be deployed as an overlay over a set of virtual extensible local area networks (VXLANs). Here, communication between a network device pair within a fabric can be via a tunnel between the pair. In an overlay network, the destination network devices (i.e., the network devices decapsulating tunnel headers) typically enforce RBTS on a packet before sending the traffic to the destination.

To deploy a VPN over the tunnels, a respective tunnel endpoint may map a respective client virtual local area network (VLAN) to a corresponding tunnel network identifier (TNI), which can identify a virtual network for a tunnel. The TNI may appear in a tunnel header that encapsulates a packet and is used to forward the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A VPN can be distributed across an overlay network. An overlay network with a VPN can also be referred to as a distributed tunnel fabric. Since the fabric is an overlay network, a respective network device in the fabric can be a tunnel endpoint of one or more tunnels.

The aspects described herein address the problem of efficiently managing resources for role-based traffic segmentation in an overlay network by (i) sending, to the source network device, a control packet indicating that the destination network device has enforced RBTS on a packet; (ii) removing the flow entry associated with the packet at the source network device based on the control packet; and (iii) maintaining a corresponding entry in a cache data structure for applying RBTS at the source network device. Here, the source and destination network devices can couple the source and destination (e.g., end devices), respectively, of a data flow. By enforcing the RBTS, the destination network device can determine that the destination is not allowed to receive traffic from the source and refrain from forwarding the packet. Based on the enforcement of RBTS, the destination network device may or may not forward the traffic to the destination (e.g., based on whether the destination is allowed to receive the traffic). Therefore, refraining from forwarding the packet is an active step associated with the enforcement of RBTS. Removing the flow entry can free the hardware resources (e.g., in the forwarding hardware of the source network device), thereby efficiently managing resources for the RBTS.

An overlay network, such as a distributed tunnel fabric (i.e., an overlay network with a VPN), can be formed when multiple network devices are coupled to each other via corresponding tunnels. In other words, a respective pair of network devices in the overlay network can be coupled to each other via a tunnel. Therefore, a respective network device in the overlay network can be a tunnel endpoint. In the underlying (or underlay) network of the overlay network, a respective network device can establish a route to every other network device. The network device can use a routing protocol, such as the Border Gateway Protocol (BGP), to establish the route. When a packet is forwarded via a tunnel, the packet is encapsulated with a tunnel header and forwarded via the corresponding route in the underlay network.

Currently, in an overlay network, the destination network devices can enforce RBTS on a packet before sending the traffic to the destination. During operation, a source network device can receive a packet from a source (e.g., an end device) and encapsulate the packet with an encapsulation header. For example, if the overlay network is formed based on VXLAN tunnels, the source network device can encapsulate the packet with a VXLAN header and send the encapsulated packet to the destination network device. The encapsulation header can include the role of the source (i.e., the source role). Upon receiving the encapsulated packet, the destination network device can obtain the source role from the encapsulation header and obtain the packet by decapsulating the encapsulation header. The destination network device can then determine the role of the destination (i.e., the destination role) and determine whether the destination role is allowed to receive traffic from the source role.

If the destination is not allowed to receive the packet, the destination network device can refrain from forwarding the packet to the destination and may drop the packet. In this way, RBTS can separate network traffic based on roles (e.g., a guest role is not allowed to receive traffic from an engineer role) at the destination network devices. Furthermore, the source network device can maintain identifying information associated with the data flow of the packet in an entry in a flow data structure to track the data flow. The flow data structure can be stored in the forwarding hardware (e.g., in a ternary content addressable memory (TCAM)) of the source network device. The identifying information of the data flow can include the source and destination addresses (e.g., the source and destination Internet Protocol (IP) addresses), source and destination protocol port numbers (e.g., Transmission Control Protocol (TCP) port number), and the protocol information (e.g., TCP or UDP).

The source network device can use the entry to identify packets of the data flow. However, if the packet is eventually dropped at the destination network device due to RBTS, the entry of the flow data structure can unnecessarily occupy limited resources of the flow data structure. If a large number of such data flows are sent from the source network device, the flow data structure can be overutilized with unused entries. Consequently, the flow data structure may not be able to allocate an entry to a legitimate data flow where the destination role is allowed to receive traffic from the source role.

To address this issue, the destination network device can notify the source network device regarding the enforcement of RBTS on a packet to allow the source network device to clear the corresponding entry from the flow data structure. During operation, the destination network device can determine that the destination role is not allowed to receive a packet from the source role and refrain from forwarding the packet to the destination. If the packet does not have any other destination (e.g., a unicast packet), the destination network device can drop the packet as well. The destination network can then send a control packet (e.g., an Internet Control Message Protocol (ICMP) packet) to the source network device indicating the RBTS enforcement for the packet. The payload of the control packet can include the identifying information of the data flow, such as source and destination addresses and protocol port numbers.

Upon receiving the control packet, the source network device can look up the identifying information in the flow data structure and identify the entry associated with the data flow. The source network device can generate a generic entry from the entry and store the generic entry in a cache data structure. Here, the cache data structure can be maintained by the control plane (i.e., stored in the memory) of the source network device. The source network device can generate the generic entry by removing the source protocol port number from the entry. Hence, the generic entry can include the source and destination addresses, the destination protocol port number, and the protocol information. Therefore, the generic entry can be independent of the source protocol port number. The source network device can then remove the identified entry from the flow data structure to free the corresponding resources (e.g., the TCAM space).

The source network device can identify flows on which the destination network device may enforce RBTS using the generic entry. Because the generic entry is not associated with a source protocol port, any other application (e.g., using any source protocol port) sending a packet to the same destination can be matched against the generic entry. Here, the packet can belong to a new data flow with a different source port number. When the packet matches the generic entry, the source network device can refrain from sending the packet via the overlay network. Here, refraining from forwarding the packet is an active step associated with the enforcement of RBTS. If the packet does not have any other destination, the source network device may drop the packet. Since the packet is not forwarded via the overlay network, the bandwidth of the links and the processing resources of the network devices of the overlay network are not used for the packet.

In addition, the source network device can also issue a local loopback control packet for the new data flow. The source network device can then receive this control packet due to the loopback nature of the packet (i.e., sent from and destined to the same device). The loopback control packet can include identifying information associated with the new data flow in its payload. Upon receiving the loopback control packet, the source network device can identify the corresponding flow entry in the flow data structure based on the identifying information and remove the identified entry from the flow data structure. Therefore, the source network device can efficiently remove unused entries from the flow data structure based on control packets received from the local device (i.e., the source network device) and other network devices.

In this disclosure, the term "switch" is used in a generic sense, and it can refer to any standalone network device or fabric switch operating in any network layer. "Switch" should not be interpreted as limiting examples of the present invention to layer-2 networks. Any device that can forward traffic to an external device or another switch can be referred to as a "switch." Furthermore, if the switch facilitates communication between networks, the switch can be referred to as a gateway switch. Any physical or virtual device (e.g., a virtual machine or switch operating on a computing device) that can operate as a network device and forward traffic to an end device can be referred to as a "switch." If the switch is a virtual device, the switch can be referred to as a virtual switch. Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an example of an overlay network supporting efficient resource management for role-based traffic segmentation in an overlay network, in accordance with an aspect of the present application. A network 100 can include a number of network devices (e.g., switches), and may include network components, such as layer-2 and layer-3 hops, and tunnels. In some examples, network 100 can be an Ethernet network, InfiniBand network, or other network, and may use a corresponding communication protocol, such as IP, FibreChannel over Ethernet (FCoE), or other protocol. Network 100 can include a number of network devices 102, 104, 112, 114, and 116. A respective network device in network 100 can be associated with a MAC address and an IP address and can include at least one processing resource. Examples of a processing resource can include, but are not limited to, a processor core, a graphics processing unit (GPU), and a tensor processing unit (TPU).

Network devices 112, 114, and 116 can operate as tunnel endpoints in an overlay network 110, such as a distributed tunnel fabric 110, where the network devices can be coupled to each other via tunnels. Therefore, network devices 112, 114, and 116 can be in fabric 110. For these network devices, tunnel encapsulation is initiated and terminated within fabric 110. Network devices in fabric 110 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), IP Security (IPsec), and Multiprotocol Label Switching (MPLS). A VPN, such as an EVPN, can be deployed over fabric 110. The tunnels in fabric 110 can be formed over an underlay network. The underlay network can be a physical network, and a respective link of the underlying network can be a physical link.

A respective network device in fabric 110 can also be in the underlay network. Furthermore, a network device operating as a tunnel endpoint can be in fabric 110. A respective pair of network devices in the underlay network can be BGP peers. Therefore, in the underlay network, a respective network device can use BGP to establish routes via which packets are forwarded. Accordingly, the encapsulated packets of fabric 110 can be forwarded via these routes in the underlay network. In some examples, network 100 can be a spine and leaf network wherein network devices 112, 114, and 116 can be leaf devices, and network devices 102 and 104 can be spine devices. Spine devices 102 and 104 can be coupled to an external network 120. Here, leaf devices 112, 114, and 116 can be in fabric 110 as tunnel endpoints. These leaf devices can also be in the underlay network, where they participate in the BGP routing of the underlay network.

In addition, spine devices 102 and 104 can be in the underlay network via which the tunnels of fabric 110 are established. Here, spine devices 102 and 104 can forward encapsulated packets of fabric 110 via the underlay network based on the corresponding tunnel headers. Under such a network topology, spine devices 102 and 104 can operate as aggregation devices that can aggregate traffic from leaf devices 112, 114, and 116. Spine devices 102 and 104 can then forward the aggregated traffic to external network 120. End device (or user device) 122 can be coupled to network device 112, and end devices 124 and 126 can be coupled to network device 116. End device 122 can be the source of a data flow, and end devices 124 and 126 can be the destinations of the data flow.

In overlay network 120, network devices 112 and 116 can be the source and destination network devices, respectively, of the data flow. Hence, network device 116 can enforce RBTS on the data flow before sending it to end devices 124 or 126. In this example, end devices 122, 124, and 126 can be associated with roles 152, 154, and 156, respectively. Network device 116 can maintain a rule 132 indicating that traffic is allowed from source role 152 to destination role 156, and rule 134 indicating that traffic is not allowed (i.e., denied) from source role 152 to destination role 154. During operation, network device 112 can receive a packet 142 from end device 122, which can also be referred to as source 122. Packet 142 can be destined to end devices 124 and 126. For example, packet 142 can be a multicast packet of a multicast group, and end devices 124 and 126 can be hosts requesting traffic of the multicast group. Therefore, packet 142 can be destined to both end devices 124 and 126.

Upon receiving packet 142, network device 112 can generate flow entry 162 for the data flow from end device 122 to end device 124 in flow data structure 160. Here, flow data structure 160 can be stored in the forwarding hardware (e.g., the TCAM) of network device 112. Entry 162 can include identifying information of the data flow, such as IP addresses of end devices 122 and 124, the protocol information associated with the data flow, and corresponding protocol ports. Similarly, network device 112 can generate flow entry 164 for the data flow from end device 122 to end device 126 in flow data structure 160. Flow entry 164 can include identifying information of the data flow from end device 122 to end device 126.

Network device 112 can encapsulate packet 142 with an encapsulation header (e.g., a VXLAN header) to generate encapsulated packet 144. Network device 112 can then send encapsulated packet 144 to network device 116 via the tunnel between network devices 112 and 116. The encapsulation header can indicate that source 122 is associated with role 152. Upon receiving encapsulated packet 144, network device 116 can obtain source role 152 from the encapsulation header and obtain packet 142 by decapsulating the encapsulation header. Network device 116 can determine roles 154 and 156 of destinations 124 and 126, respectively. Network device 116 can then check rules 132 and 134 to determine whether destination roles 154 and 156 are allowed to receive traffic from source role 152.

Based on rule 132, network device 116 can determine that destination role 156 is allowed to receive packet 142 because it is sent from source role 152. Hence, network device 116 can forward packet 142 to end device 126. Furthermore, based on rule 134, network device 116 can determine that destination role 154 is not allowed to receive packet 142 and hence, refrain from forwarding packet 142 to end device 124. Here, refraining from forwarding packet 142 is an active step associated with the enforcement of RBTS at network device 116. In this way, RBTS can separate network traffic based on roles 152, 154, and 156 at network device 116. However, since packet 142 is eventually not forwarded to end device 124 due to the enforcement of RBTS, entry 162 can unnecessarily occupy limited resources of flow data structure 160. If a large number of such data flows are sent from network device 112, flow data structure 160 can be overutilized with unused entries. Consequently, flow data structure 160 may not be able to allocate an entry to a subsequent legitimate data flow.

To address this issue, network device 116 can notify network device 112 regarding the enforcement of RBTS on packet 142 for end device 124. When network device 116 determines that end device 124 may not receive packet 142 because of its role 154, network device 116 can send a control packet 146 (e.g., an ICMP packet) to network device 112 indicating the RBTS enforcement for end device 142. The payload of control packet 146 can include the identifying information of the data flow between end devices 122 and 124, such as source and destination addresses of end devices 122 and 124 and protocol port numbers. Control packet 146 can indicate that role 154 is precluded from receiving traffic from role 152. Upon receiving control packet 146, network device 112 can look up the identifying information in flow data structure 160 and remove entry 162 based on the identifying information to free the corresponding resources. In addition, since packet 142 is delivered to end device 126, network device 112 can continue to maintain entry 164 in flow data structure 160.

Figure 2A:
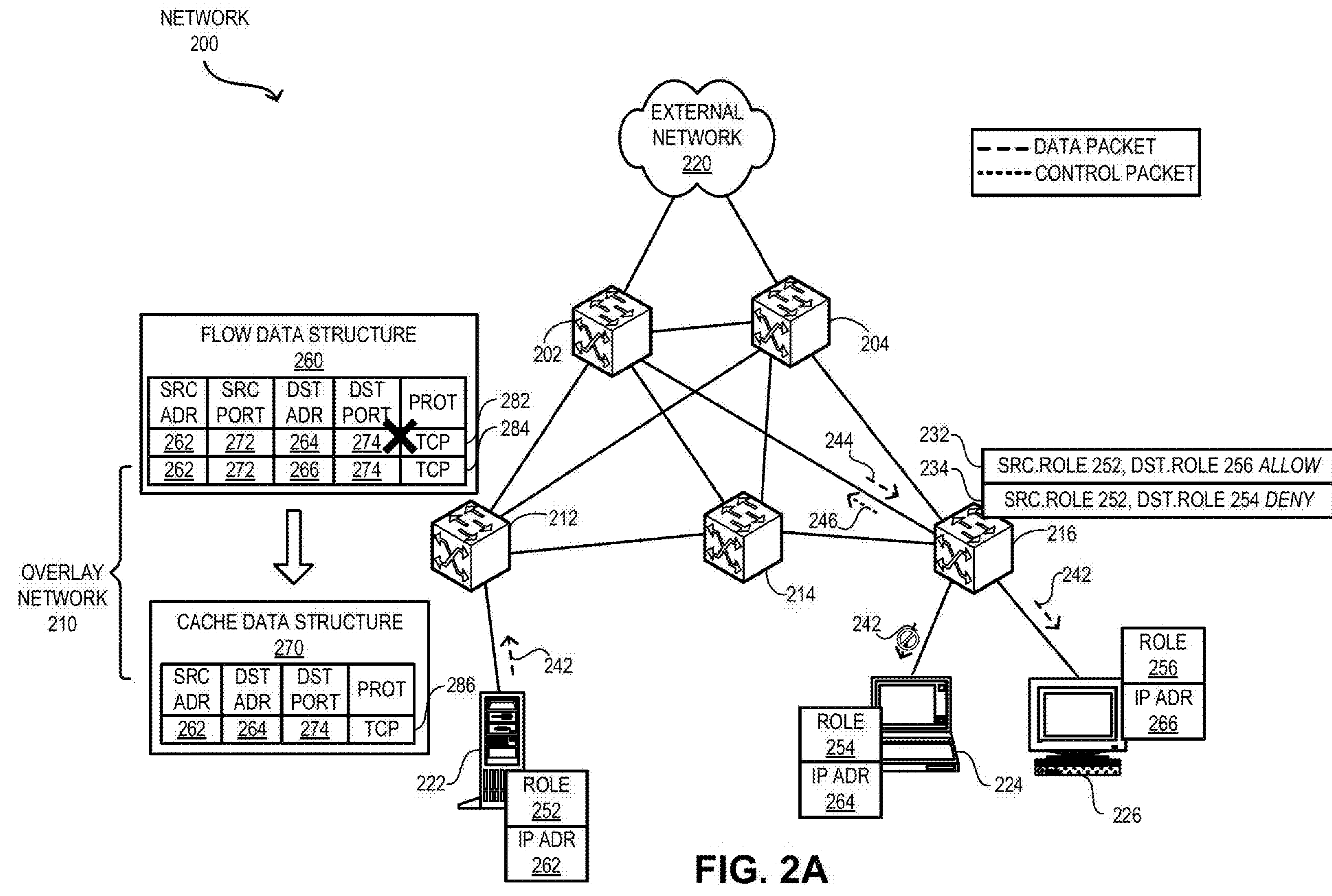
FIG. 2A illustrates an example of a cache data structure for facilitating efficient resource management for role-based traffic segmentation in an overlay network, in accordance with an aspect of the present application.

FIG. 2A illustrates an example of a cache data structure for facilitating efficient resource management for role-based traffic segmentation in an overlay network, in accordance with an aspect of the present application. A network 200 can include a number of network devices (e.g., switches), and may include network components, such as layer-2 and layer-3 hops, and tunnels. In some examples, network 200 can be an Ethernet network, InfiniBand network, or other network, and may use a corresponding communication protocol, such as IP, FCoE, or other protocol. Network 200 can include a number of network devices 202, 204, 212, 214, and 216. A respective network device in network 200 can be associated with a MAC address and an IP address and can include at least one processing resource. Examples of a processing resource can include, but are not limited to, a processor core, a GPU, and a TPU.

Network devices 212, 214, and 216 can operate as tunnel endpoints in an overlay network 210, such as a distributed tunnel fabric 210, where the network devices can be coupled to each other via tunnels. Therefore, network devices 212, 214, and 216 can be in fabric 210. For these network devices, tunnel encapsulation is initiated and terminated within fabric 210. Network devices in fabric 210 may form a mesh of tunnels. Examples of a tunnel can include, but are not limited to, VXLAN, GRE, NVGRE, Geneve, IPsec, and MPLS. A VPN, such as an EVPN, can be deployed over fabric 210. In network 200, network devices 202 and 204 can operate as aggregation devices that can aggregate traffic from network devices 212, 214, and 216. Network devices 202 and 204 can then forward the aggregated traffic to external network 220. End device 222 can be coupled to network device 212, and end devices 224 and 226 can be coupled to network device 216. End device 222 can be the source of a data flow, and end devices 224 and 226 can be the destinations of the data flow.

In overlay network 220, network devices 212 and 216 can be the source and destination network devices, respectively, of the data flow. Hence, network device 216 can enforce RBTS on the data flow before sending it to end devices 224 or 226. Here, end devices 222, 224, and 226 can be associated with roles 252, 254, and 256, respectively. In addition, IP addresses 262, 264, and 266 can be allocated to end devices 222, 224, and 226, respectively. Network device 216 can maintain a rule 232 indicating that traffic is allowed from source role 252 to destination role 256, and rule 234 indicating that traffic is not allowed (i.e., denied) from source role 252 to destination role 254. During operation, network device 212 can receive a packet 242 from end device 222, which can also be referred to as source 222. Packet 242 can be destined to end devices 224 and 226.

Upon receiving packet 242, network device 212 can generate flow entry 282 for the data flow from end device 222 to end device 224 in flow data structure 260. Here, flow data structure 260 can be stored in the forwarding hardware (e.g., the TCAM) of network device 212. Entry 282 can include identifying information of the data flow, such as IP addresses 262 and 264 of end devices 222 and 224, the protocol information associated with the data flow (e.g., TCP), and source and destination protocol port numbers 272 and 274, respectively. Here, protocol port numbers 272 and 274 can be TCP port numbers. Similarly, network device 212 can generate flow entry 284 for the data flow from end device 222 to end device 226 in flow data structure 260. Flow entry 284 can include IP addresses 262 and 266 of end devices 222 and 226, the protocol information associated with the data flow (e.g., TCP), and source and destination protocol port numbers 272 and 274, respectively.

Network device 212 can encapsulate packet 242 with an encapsulation header (e.g., a VXLAN header) to generate encapsulated packet 244. Network device 212 can then send encapsulated packet 244 to network device 216 via the tunnel between network devices 212 and 216. Upon receiving encapsulated packet 244, network device 216 can determine source role 252 and destination roles 254 and 256. Network device 116 can then check rules 232 and 234 to determine whether destination roles 254 and 256, respectively, are allowed to receive traffic from source role 252. Based on rule 232, network device 216 can determine that destination role 256 is allowed to receive packet 242 because it is sent from source role 252. Hence, network device 216 can forward packet 242 to end device 226.

Furthermore, based on rule 234, network device 216 can determine that destination role 254 is not allowed to receive packet 242 and hence, refrain from forwarding packet 242 to end device 224. Here, refraining from forwarding packet 242 is an active step associated with the enforcement of RBTS at network device 216. When network device 216 determines that end device 224 may not receive packet 242 because of its role 254, network device 216 can send a control packet 246 (e.g., an ICMP packet) to network device 212 indicating the RBTS enforcement for end device 242. The payload of control packet 246 can include the identifying information of the data flow between end devices 222 and 224, such as IP addresses 262 and 264 of end devices 222 and 224, respectively, protocol port numbers 272 and 274, and protocol information. Control packet 246 can indicate that role 254 is precluded from receiving traffic from role 252.

Upon receiving control packet 246, network device 212 can look up the identifying information in flow data structure 260 and identify entry 282 based on the identifying information. Network device 212 can generate a generic entry 286 based on entry 282 and store entry 286 in a cache data structure 270. Cache data structure 270 can be maintained by the control plane (i.e., stored in the memory) of network device 212. Here, network device 212 can generate entry 286 by removing source protocol port number 272 from entry 282. Hence, entry 286 can include source and destination IP addresses 262 and 264, destination protocol port number 274, and the protocol information. Therefore, entry 286 can be independent of a source protocol port number. Network device 212 can then remove entry 282 from flow data structure 260 to free the corresponding resources, such as the TCAM space storing entry 282. In addition, since packet 242 is delivered to end device 226, network device 212 can continue to maintain entry 284 in flow data structure 260.

Figure 2B:
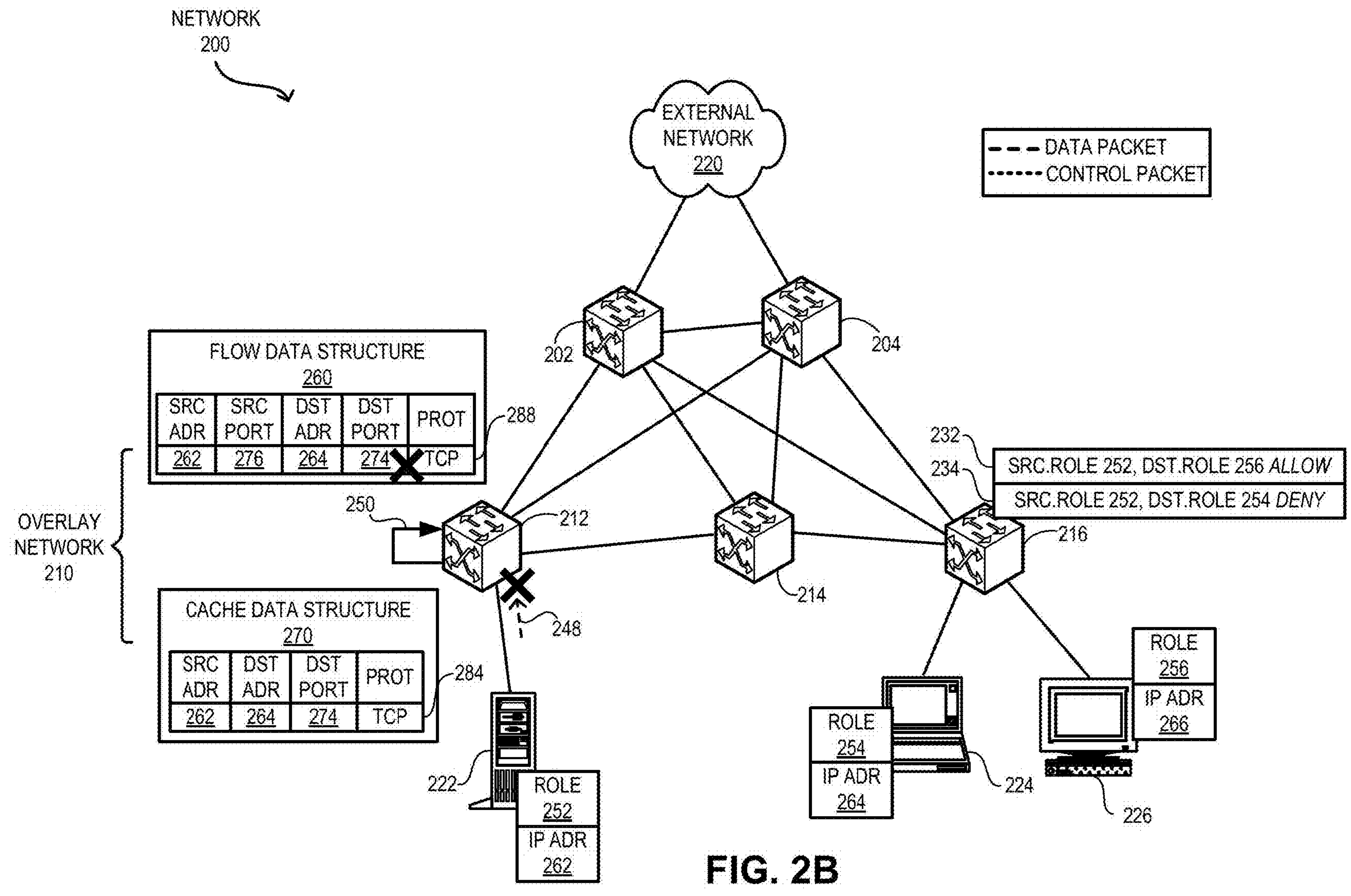
FIG. 2B illustrates an example of role-based traffic segmentation at a source network device based on a cache data structure, in accordance with an aspect of the present application.

FIG. 2B illustrates an example of role-based traffic segmentation at a source network device based on a cache data structure, in accordance with an aspect of the present application. Network device 212 can enforce RBTS based on entry 286, which can be used to identify corresponding flows. Suppose that another application on end device 222 sends a packet 248 using another source protocol port 276 to end device 224. Network device 212 can receive packet 248 and generate flow entry 288 for the data flow in flow data structure 260. Entry 288 can include identifying information of the data flow, such as IP addresses 262 and 264 of end devices 222 and 224, respectively, the protocol information associated with the data flow (e.g., TCP), and source and destination protocol port numbers 276 and 274, respectively.

Because entry 286 is not associated with a particular source protocol port, packet 248 can be matched against entry 286. When packet 248 matches entry 286, network device 212 can refrain from sending packet 248 to end device 224 via overlay network 210. Here, refraining from forwarding packet 248 is an active step associated with the enforcement of RBTS at network device 212. If packet 248 does not have any other destination (e.g., a unicast packet), network device 248 may drop packet 248. Since packet 248 is not forwarded to end device 224 via overlay network 210, the bandwidth of the links and the processing resources of the network devices of overlay network 210 are not used for packet 248.

In addition, network device 212 can also issue a local loopback control packet 250 for the new data flow between end devices 222 and 224. Network device 212 can then receive control packet 250 due to the loopback nature of packet 250 (i.e., sent from and destined to network device 212). Control packet 250 can include identifying information associated with the new data flow in its payload. Here, the payload of control packet 250 can include IP addresses 262 and 264 of end devices 222 and 224, respectively, protocol port numbers 276 and 274, and protocol information.

Upon receiving control packet 250, network device 212 can identify the corresponding flow entry 288 in flow data structure 260 based on the identifying information in control packet 250. Network device 212 can then remove entry 288 from flow data structure 260. Therefore, network device 212 can efficiently remove unused entries from flow data structure 260 based on control packets received from the local device (i.e., loopback packets from network device 212) and other network devices, such as network device 216.

Figure 3:
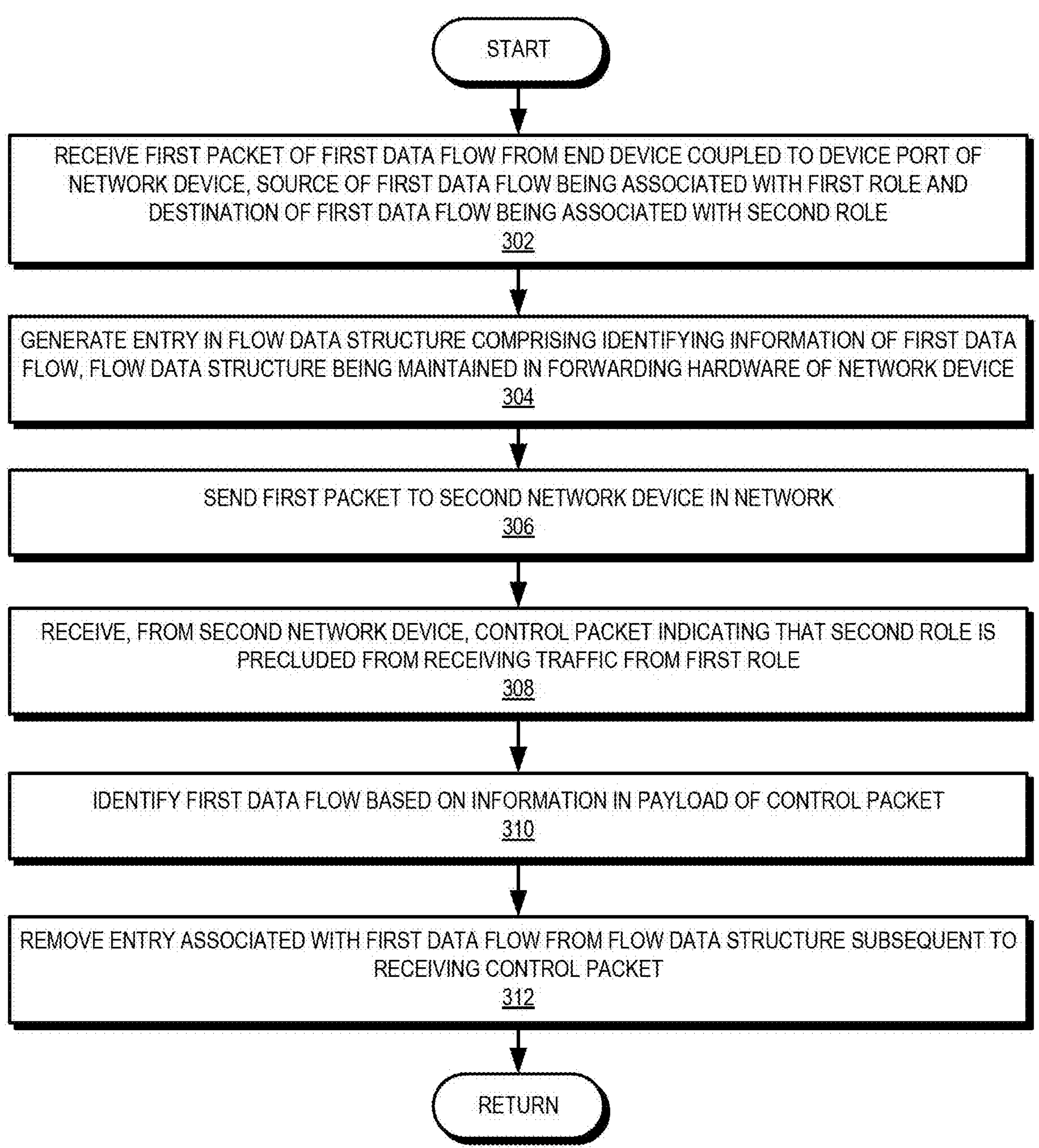
FIG. 3 presents a flowchart illustrating an example of a process of a network device in an overlay network efficiently managing resources for role-based traffic segmentation, in accordance with an aspect of the present application.

FIG. 3 presents a flowchart illustrating an example of a process of a network device in an overlay network efficiently managing resources for role-based traffic segmentation, in accordance with an aspect of the present application. During operation, the network device can receive a first packet of a first data flow from an end device coupled to a device port of the network device (operation 302). Here, the end device can be the source of the first data flow. The source of the data flow can be associated with a first role and the destination of the data flow can be associated with a second role. In the example in FIG. 1, the first packet can be packet 142, the source and destinations of the data flow can be end devices 122 and 124, respectively, and the first and second roles can be roles 152 and 154, respectively.

The network device can then generate an entry in the flow data structure (e.g., entry 162 in flow data structure 160 of FIG. 1) comprising identifying information of the first data flow (operation 304). The flow data structure can be maintained in the forwarding hardware of the network device. The network device can use the entry to identify the packets of the first data flow. The identifying information can include source and destination addresses, source and destination protocol port numbers, and the protocol information. The network device can then send the first packet to a second network device in the network (operation 306). Here, the second network device (e.g., network device 116 in FIG. 1) can be the destination network device of the first data flow.

The network device can receive, from the second network device, a control packet (e.g., packet 146 in FIG. 1) indicating that the second role is precluded from receiving traffic from the first role (operation 308). The payload of the control packet can include identifying information associated with the first data flow, which can allow the first network device to identify the corresponding entry in the flow data structure. Accordingly, the network device can identify the first data flow (i.e., the data flow between end devices 122 and 124 in FIG. 1) based on the information in the payload of the control packet (operation 310). The control packet can trigger the removal of the entry associated with the first data flow. Hence, the network device can remove the entry associated with the first data flow from the flow data structure (e.g., entry 162 in flow data structure 160 of FIG. 1) subsequent to receiving the control packet (operation 312).

Figure 4:
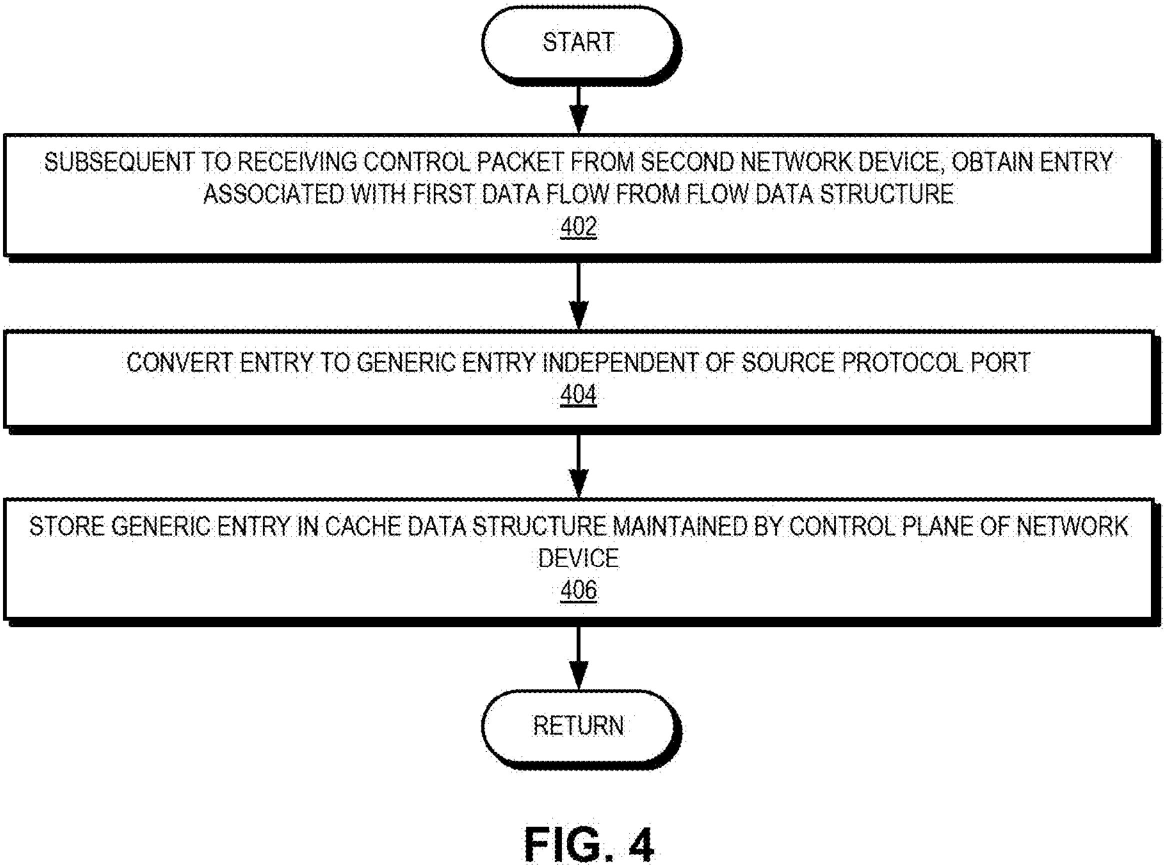
FIG. 4 presents a flowchart illustrating an example of a process of a network device in an overlay network generating an entry in a cache data structure for efficient resource management for role-based traffic segmentation, in accordance with an aspect of the present application.

FIG. 4 presents a flowchart illustrating an example of a process of a network device in an overlay network generating an entry in a cache data structure for efficient resource management for role-based traffic segmentation, in accordance with an aspect of the present application. During operation, the network device can, subsequent to receiving the control packet from the second network device, obtain an entry associated with the first data flow from the flow data structure (operation 402). Because the payload of the control packet can include the identifying information of the first data flow, the network device can use the identifying information to obtain the entry. In the example in FIG. 2A, network device 212 can receive control packet 246. Based on the identifying information in control packet 246, network device 212 can obtain entry 282 from flow data structure 260.

The network device can then convert the entry to a generic entry independent of a source protocol port (operation 404). Typically, the entry of the flow data structure can include source and destination addresses, source and destination protocol port numbers, and protocol information. However, if the source protocol port number is removed, the entry can become generic and applicable to any application running on the source sending traffic to the destination using the same protocol. The network device can store the generic entry in a cache data structure maintained by the control plane of the network device (operation 406). In the example in FIG. 2A, network device 212 can remove source protocol port number 272 from entry 282 and generate generic entry 286. Network device 212 can then store entry 286 in cache data structure 270 stored in the memory of network device 212.

Figure 5:
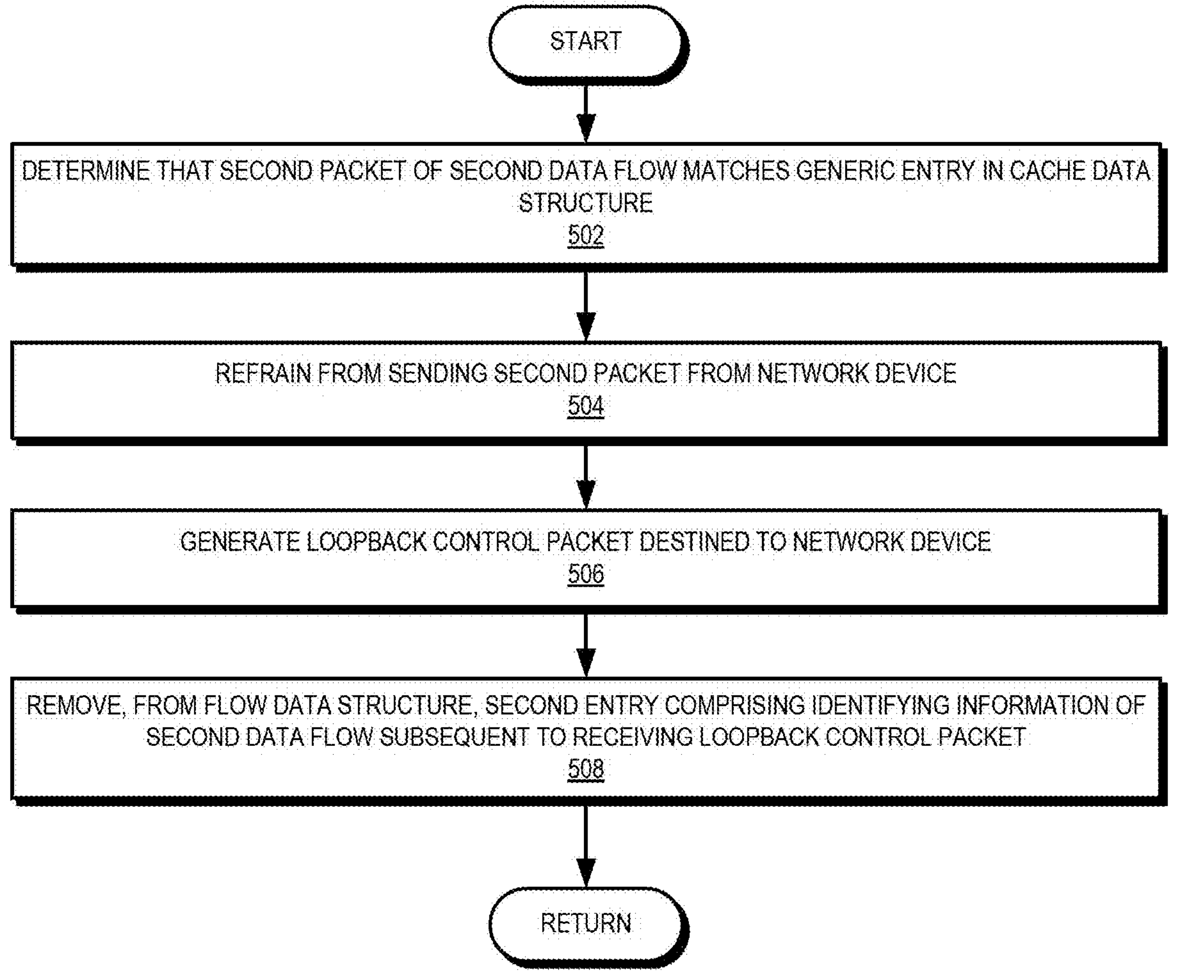
FIG. 5 presents a flowchart illustrating an example of a process of a source network device in an overlay network terminating traffic flow based on a cache data structure, in accordance with an aspect of the present application.

FIG. 5 presents a flowchart illustrating an example of a process of a source network device in an overlay network terminating traffic flow based on a cache data structure, in accordance with an aspect of the present application. During operation, the network device determines that a second packet of a second data flow matches the generic entry (i.e., the generic entry generated based on operation 406 of FIG. 4) in the cache data structure (operation 502). The second packet can match the generic entry if the source and destination addresses as well as the destination port number of the second packet match the generic entry. The network device can then refrain from sending the second packet from the network device (operation 504). In the example in FIG. 2B, packet 248 can match entry 286 in cache data structure 270 of network device 212. Network device 212 can then refrain from forwarding packet 248 to its destination via overlay network 210.

The network device can generate a loop-back control packet (e.g., control packet 250 in FIG. 2B) destined to the network device (operation 506). The network device can then receive this loopback control packet due to the loopback nature of the control packet (i.e., sent from and destined to the same network device). The loopback control packet can include identifying information associated with the second data flow in its payload. The network device can then remove, from the flow data structure, a second entry (e.g., entry 288 in flow data structure 260 of FIG. 2B) comprising identifying information of the second data flow subsequent to receiving the loopback control packet (operation 508). Since the network device can remove a corresponding entry from the flow data structure upon receiving a control packet, the loopback control packet can also cause the network device to remove the entry.

Figure 6:
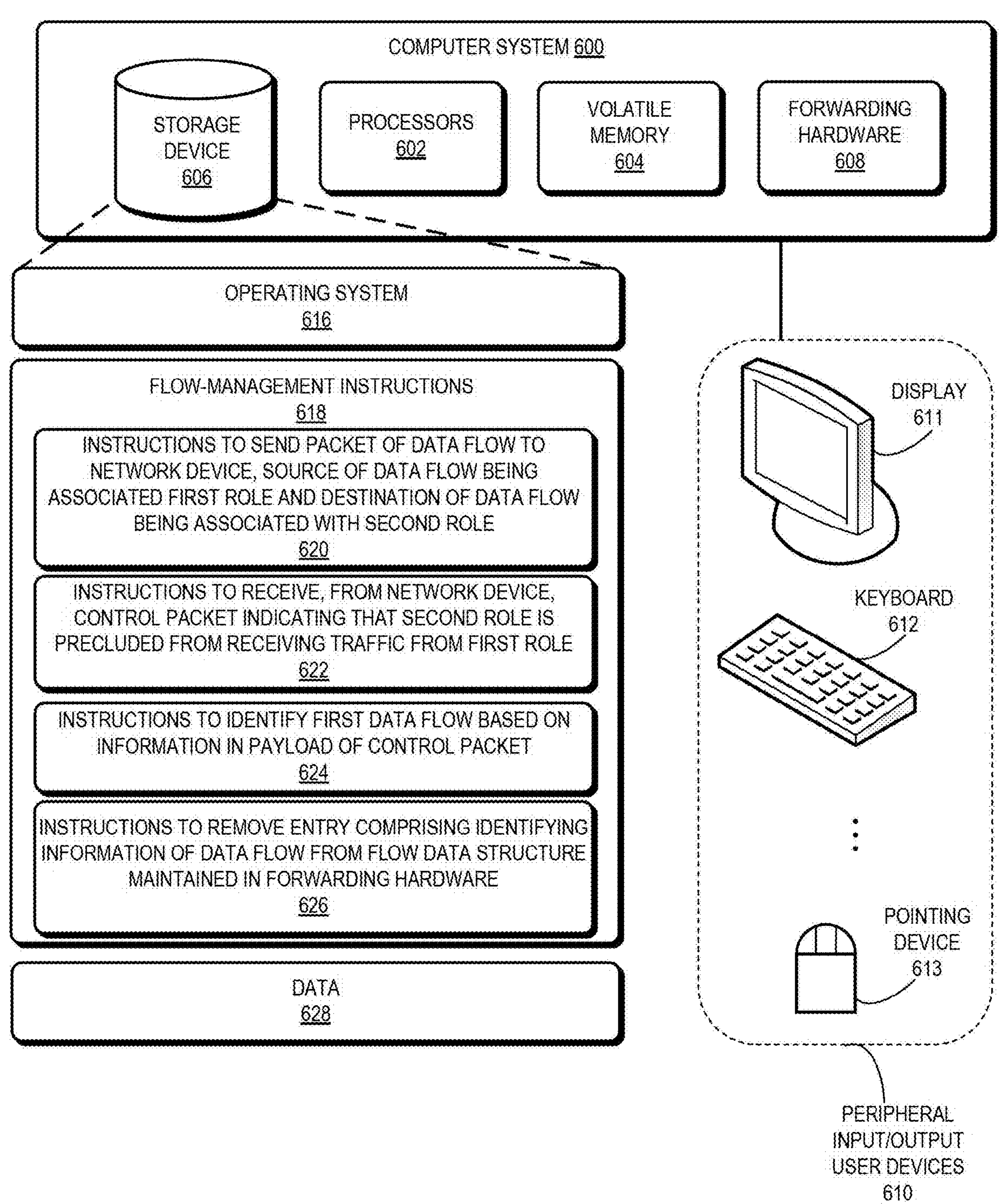
FIG. 6 illustrates an example of a computing system facilitating efficient resource management for role-based traffic segmentation in an overlay network, in accordance with an aspect of the present application.

FIG. 6 illustrates an example of a computing system facilitating efficient split management in a virtual switch, in accordance with an aspect of the present application. Computer system 600 includes one or more processors 602, a memory 604, and a storage device 606. Processors 602 can include one or more processing resources, such as processor cores, GPUs, and TPUs. Memory 604 can include a volatile memory (e.g., random access memory (RAM)) that serves as a managed memory and can be used to store one or more memory pools. Furthermore, computer system 600 can be coupled to peripheral 1/O user devices 610 (e.g., a display device 611, a keyboard 612, and a pointing device 613). Storage device 606 includes a non-transitory computer-readable storage medium and stores an operating system 616, flow-management instructions 618, and data 628. Computer system 600 may include fewer or more entities or instructions than those shown in FIG. 6.

Flow-management instructions 618 can include instructions, which when executed by computer system 600, can cause computer system 600 to perform methods and/or processes described in this disclosure. Computer system 600 can be a network device, such as network device 112 in FIG. 1. Specifically, flow-management instructions 618 may include instructions 620 to send a packet of a data flow to a network device. Here, the source of the data flow can be associated with a first role and the destination of the data flow can be associated with a second role. In the example in FIG. 1, the source and destination roles of packet 142 can be roles 152 and 154, which can correspond to the first and second roles, respectively.

Flow-management instructions 618 may also include instructions 622 to receive, from the network device, a control packet indicating that the second role is precluded from receiving traffic from the first role. An example of the control packet can be control packet 146 in FIG. 1. Furthermore, flow-management instructions 618 may also include instructions 624 to identify the first data flow based on the information in the payload of the control packet. The payload can include identifying information of the first data flow. Based on the identifying information in control packet 146, network device 112 of FIG. 1 can identify the data flow between end devices 122 and 124.

Flow-management instructions 618 may include instructions 626 to remove an entry comprising identifying information of the data flow from the flow data structure maintained in the forwarding hardware. For example, network device 112 of FIG. 1 can remove entry 162 from flow data structure 160 maintained in the forwarding hardware of network device 112. Data 628 can include any data that is required as input, or that is generated as output by the methods, operations, communications, and/or processes described in this disclosure. Specifically, data 628 can include the entries in the flow data structure, the generic entries in the cache data structure, and a set of rules for applying RBTS.

Computer system 600 and flow-management instructions 618 may include more instructions than those shown in FIG. 6. For example, flow-management instructions 618 can also store instructions for applying RBTS based on rules 132 and 134 at network device 116 of FIG. 1; generating a generic entry 286 based on entry 282 of flow data structure 260 of FIG. 2A; refraining from forwarding a packet based on generic entry 286 of FIG. 2B; generating a loopback control packet 250 and removing entry 288 from flow data structure 260 of FIG. 2B, the operations depicted in the flowcharts of FIGS. 3, 4, and 5; and the instructions of non-transitory CRM 700 in FIG. 7.

FIG. 7 illustrates an example of a CRM facilitating efficient split management in a virtual switch, in accordance with an aspect of the present application. CRM 700 can include one or more non-transitory computer-readable mediums or devices storing instructions that when executed by a computer or processor cause the computer or processor to perform a method. Therefore, the instructions in CRM 700 can be stored in one or more non-transitory computer-readable mediums or devices. CRM 700 can store instructions 710 to send, by a first network device, a packet of a data flow to a second network device. Here, the source and destination of the data flow can be associated with the first and second roles, respectively. In the example in FIG. 1, the source and destination roles of packet 142 can be roles 152 and 154, which can correspond to the first and second roles, respectively.

CRM 700 can also include instructions 712 to receive, from the second network device, a control packet indicating that the second role is precluded from receiving traffic from the first role. An example of the control packet can be control packet 146 in FIG. 1. CRM 700 can include instructions 714 to identify the first data flow based on the information in the payload of the control packet. The payload can include identifying information of the first data flow. Based on the identifying information in control packet 146, network device 112 of FIG. 1 can identify the data flow between end devices 122 and 124.

CRM 700 can additionally include instructions 716 to remove an entry, which comprises identifying information of the data flow, from the flow data structure maintained in the forwarding hardware of the first network device. For example, network device 112 of FIG. 1 can remove entry 162 from flow data structure 160 maintained in the forwarding hardware of network device 112.

CRM 700 may include more instructions than those shown in FIG. 7. For example, CRM 700 can also store instructions for applying RBTS based on rules 132 and 134 at network device 116 of FIG. 1; generating a generic entry 286 based on entry 282 of flow data structure 260 of FIG. 2A; refraining from forwarding a packet based on generic entry 286 of FIG. 2B; generating a loopback control packet 250 and removing entry 288 from flow data structure 260 of FIG. 2B, the operations depicted in the flowcharts of FIGS. 3, 4, and 5; and the instructions of computer system 600 in FIG. 6.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a first network device in a network. During operation, the first network device can send a first packet of a first data flow to a second network device in the network. Here, a source of the first data flow can be associated with a first role and a destination of the first data flow can be associated with a second role. The first network device can receive, from the second network device, a control packet indicating that the second role is precluded from receiving traffic from the first role. The first network device can then identify the first data flow based on information in a payload of the control packet and remove an entry from a flow data structure maintained in the forwarding hardware of the first network device. The entry can include identifying information of the first data flow.

In a variation on this aspect, the first network device can receive the first packet from an end device coupled to a device port of the first network device. The first network device can then generating the entry in the flow table in response to receiving the packet.

In a further variation, the first network device can convert the entry to a generic entry independent of a source protocol port and store the generic entry in a cache data structure maintained by a control plane of the network device.

In a further variation, the first network device can determine that a second packet of a second data flow matches the generic entry in the cache data structure. The first network device can then refrain from sending the second packet from the first network device.

In a further variation, the first network device can generate a loop-back control packet destined to the network device. The first network device can then remove, from the flow data structure, a second entry comprising identifying information of the second data flow in response to receiving the loop-back control packet.

In a variation on this aspect, the identifying information of the first data flow can include one or more of: a source protocol port identifier, a source network address, a destination protocol port identifier, a destination network address, and a name of a protocol associated with the first data flow.

In a variation on this aspect, the control packet can include an Internet Control Message Protocol (ICMP) packet indicating the unreachability of a destination of the first packet.

In a variation on this aspect, the second network device can enforce role-based segmentation on the first data flow based on the first and second roles. Receiving the control packet from the second network device can then indicate that the second network device is to refrain from forwarding the first packet to the destination.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:

sending, by a first network device in a network, a first packet of a first data flow to a second network device in the network, wherein a source of the first data flow is associated with a first role and a destination of the first data flow is associated with a second role;

receiving, by the first network device and from the second network device, a control packet indicating that the second role is precluded from receiving traffic from the first role, wherein a payload of the control packet includes a source protocol port identifier and a destination protocol port identifier of the first data flow;

identifying, by the first network device, an entry from a data flow structure associated with the first data flow based on the payload of the control packet, wherein the flow data structure is maintained in forwarding hardware of the first network device, and wherein the entry comprises the source protocol port identifier of the first data flow; and removing, by the first network device, the entry from the flow data structure.

2. The method of claim 1, further comprising:

receiving the first packet from an end device coupled to a device port of the first network device; and generating the entry in a flow table in response to receiving the packet.

3. The method of claim 2, further comprising:

converting the entry to a generic entry independent of the source protocol port identifier; and storing the generic entry in a cache data structure maintained by a control plane of the network device.

4. The method of claim 3, further comprising:

determining, by the first network device, that a second packet of a second data flow matches the generic entry in the cache data structure; and refraining from sending the second packet from the first network device.

5. The method of claim 4, further comprising:

generating, at the first network device, a loop-back control packet destined to the network device; and removing, from the flow data structure, a second entry comprising identifying information of the second data flow in response to receiving the loop-back control packet.

6. The method of claim 1, wherein the payload of the control packet further includes one or more of: a source network address, a destination network address, and a name of a protocol associated with the first data flow.

7. The method of claim 1, wherein the control packet comprises an Internet Control Message Protocol (ICMP) packet indicating unreachability of a destination of the first packet.

8. The method of claim 1, wherein the second network device is to enforce role-based segmentation on the first data flow based on the first and second roles; and wherein receiving the control packet from the second network device indicates that the second network device is to refrain from forwarding the first packet to the destination.

9. A non-transitory computer-readable storage medium storing instructions, the instructions comprising:

one or more instructions that, when executed by one or more processors of a first network device to: send, in a network, a first packet of a first data flow to a second network device in the network, wherein a source of the first data flow is associated with a first role and a destination of the first data flow is associated with a second role;

receive, from the second network device, a control packet indicating that the second role is precluded from receiving traffic from the first role, wherein a payload of the control packet includes a source protocol port identifier and a destination protocol port identifier of the first data flow;

identify an entry from a flow data structure associated with the first data flow based on the payload of the control packet, wherein the flow data structure is maintained in forwarding hardware of the first network device, and wherein the entry comprises the source protocol port identifier of the first data flow; and remove the entry from the flow data structure.

10. The non-transitory computer-readable storage medium of claim 9, wherein the instructions executed by the one or more processors cause the first network device to:

receive the first packet from an end device coupled to a device port of the first network device; and generate the entry in a flow table in response to receiving the packet.

11. The non-transitory computer-readable storage medium of claim 10, wherein the instructions executed by the one or more processors cause the first network device to:

convert the entry to a generic entry independent of the source protocol port identifier; and store the generic entry in a cache data structure maintained by a control plane of the network device.

12. The non-transitory computer-readable storage medium of claim 11, wherein the instructions executed by the one or more processors cause the first network device to:

determine, by the first network device, that a second packet of a second data flow matches the generic entry in the cache data structure; and refrain from sending the second packet from the first network device.

13. The non-transitory computer-readable storage medium of claim 12, wherein the instructions executed by the one or more processors cause the first network device to:

generate, at the first network device, a loop-back control packet destined to the network device; and remove, from the flow data structure, a second entry comprising identifying information of the second data flow in response to receiving the loop-back control packet.

14. The non-transitory computer-readable storage medium of claim 9, wherein the payload of the control packet further includes one or more of: a source network address, a destination network address, and a name of a protocol associated with the first data flow.

15. The non-transitory computer-readable storage medium of claim 9, wherein the control packet comprises an Internet Control Message Protocol (ICMP) packet indicating unreachability of a destination of the first packet.

16. The non-transitory computer-readable storage medium of claim 9, wherein the second network device is to enforce role-based segmentation on the first data flow based on the first and second roles; and wherein receiving the control packet from the second network device indicates that the second network device is to refrain from forwarding the first packet to the destination.

17. A computer system, comprising:

one or more processing resources, wherein instructions executed by the one or more processing resources cause a first network device to:

send, by a first network device in a network, a first packet of a first data flow to a second network device via a network, wherein a source of the first data flow is associated with a first role and a destination of the first data flow is associated with a second role;

receive, from the second network device, a control packet indicating that the second role is precluded from receiving traffic from the first role, wherein a payload of the control packet includes a source protocol port identifier and a destination protocol port identifier of the first data flow;

identify an entry from a flow data structure associate with the first data flow based on the payload of the control packet, wherein the flow data structure is maintained in forwarding hardware of the first network device, and wherein the entry comprises the source protocol port identifier of the first data flow; and remove the entry from the flow data structure.

18. The computer system of claim 17, wherein the instructions executed by the one or more processing resources cause the first network device further to:

convert the entry to a generic entry independent of the source protocol port; and store the generic entry in a cache data structure maintained by a control plane of the network device.

19. The computer system of claim 18, wherein the instructions executed by the one or more processing resources cause the first network device further to:

determine, by the first network device, that a second packet of a second data flow matches the generic entry in the cache data structure; and refrain from sending the second packet from the first network device.

20. The computer system of claim 19, wherein the instructions executed by the one or more processing resources cause the first network device further to:

generate, at the first network device, a loop-back control packet destined to the network device; and remove, from the flow data structure, a second entry comprising identifying information of the second data flow in response to receiving the loop-back control packet.

* * * * *